Dec. 12, 1961 D. C. COX 3,012,666

ELECTRICAL COLOR SEPARATION

Filed Dec. 12, 1952 4 Sheets-Sheet 1

INVENTOR.
DAVID C. COX

BY
RICHEY, WATTS, EDGERTON & McNENNY
Frederic B. Schramm
ATTORNEYS

ELECTRICAL COLOR SEPARATION

Filed Dec. 12, 1952 4 Sheets-Sheet 2

INVENTOR.
DAVID C. COX

BY
RICHEY, WATTS, EDGERTON & McNENNY
Frederic B. Schramm
ATTORNEYS

INVENTOR.
DAVID C. COX
BY
RICHEY, WATTS, EDGERTON & McNENNY
Frederic B. Schramm
ATTORNEYS

ELECTRICAL COLOR SEPARATION

Filed Dec. 12, 1952 4 Sheets-Sheet 4

INVENTOR.
DAVID C. COX

BY
RICHEY, WATTS, EDGERTON & McNENNY
Frederic B. Schramm
ATTORNEYS

United States Patent Office 3,012,666

Patented Dec. 12, 1961

3,012,666
ELECTRICAL COLOR SEPARATION

David C. Cox, Grand Rapids, Mich., assignor to Mandrel Industries, Inc., a corporation of Michigan Filed Dec. 12, 1952, Ser. No. 325,586
23 Claims. (Cl. 209—111.5)

This application is a continuation-in-part of my copending application Serial No. 294,427, filed June 19, 1952, now Patent No. 2,833,937.

The present invention relates to thermionic circuits and to sorting and concerns particularly the employment of the circuits in color sorting.

An object of the invention is to provide improved, more accurate and more selective sorting of articles with respect to their color.

A more specific object of the invention is to accomplish such selective color sorting by electric means without cathode ray tubes or screen masks. Still another object of the invention is to accomplish accurate and reliable color sorting economically, avoiding need for expensive maintenance and avoiding the use of expensive equipment. A further object is to simulate electrically the production of a two-dimensional pattern having boundary lines which may include sloping, horizontal, and vertical line segments.

Other and further objects, features and advantages of the invention will become apparent as the description proceeds.

In my parent application I have described a photoelectric amplifier circuit of such linearity and providing a reverse output signal following the direct output signal with such faithfulness that additive and subtractive signals may be generated for use in color work to simulate the outlines of cathode tube masks of the type, designated by reference numeral 54, disclosed in FIG. 1 of the drawing of my copending application, Serial Number 738,714, filed April 1, 1947, now Patent No. 2,625,265, and constituting an improvement of the bi-chromatic sorting machine disclosed in my Patent Number 2,244,826.

In carrying out my present invention I utilize a highly linear amplifier circuit and in some cases employ a reverse output signal which faithfully follows the positive output signal. For accomplishing bi-chromatic sorting a sorting head is employed supplying two output light beams or optical channels having different color filters with independent photoelectric amplifier means. The arrangement in this latter respect is similar to that in my application, Serial Number 738,714, now Patent No. 2,625,265.

In certain types of color operation one optical channel and its corresponding electric channel is set to trip at a predetermined value of one colored light and the other to trip at a predetermined value of a different colored light. Considering the bi-chromatic graph represented by such an arrangement an L-shaped area is blocked off as a pattern formed which defines articles of predetermined color range which are passed by the mechanism. For certain color operations, however, the object to be selected or rejected, according to the manner in which the apparatus is operated, does not fall within the area which can be included or blocked off by horizontal or vertical lines and in such cases I provide means for producing an oblique pattern boundary line by combining the output from the two amplifier channels for the two different colors. The slope is varied by varying the relative magnitude of the output channels. For still more difficult operations I employ limiter means for cutting off the corner of the simulated pattern boundary line.

In carrying out my invention in accordance with a preferred form thereof I provide a sorting head with a suitable optical system for projecting a beam of light reflected from the objects sorted, suitable means for splitting the light beam from the sorting head into two parts such as a half silvered mirror for examlpe, two filters transmitting two different ranges of wave lengths such as a red filter and a green filter, for example, each interposed in one of the two beams into which the original beam has been split, photoelectric means and linear photoelectric amplifiers for each filtered light beam, and article ejecting or manipulating mechanism responsive to the linear amplifiers. Preferably in order to increase the versatility of the apparatus, the linear amplifiers are of the type providing two symmetrical outputs of opposite polarity so that light- or dark-trip operation may be obtained. Connected to the amplifiers are light or dark trip switches.

One or more output gates or lanes are provided, according to the number of groups, into which selection is to be made. A single gate or lane serves for classification into two groups and additional gates or lanes may be provided if classification is required into additional groups greater than two in number. There are light and dark trip switches for each lane of each linear amplifier. A mixer circuit is provided for each lane, each mixer circuit being interposed between the output of the light or dark trip switch of one linear amplifier for a given lane and the light or dark trip switch of the other linear amplifier for the same lane. Where there is more than one lane, each mixer is provided with tripping or ejecting mechanism, which may take the form of the thyratrons and solenoid operators or trip pan solenoids disclosed in my parent application.

Controls are provided so that adjustment may be made in the proportion of the output of either amplifier in each lane as well as in the fraction of the combined output supplied to the solenoid operator or the trip mechanism. In this manner each lane works independently and the line representing the output characteristic or pattern boundary of the lane may be adjusted both in slope and position for the purpose of selecting not only the reflectivity but also the color characteristic of the article to be sorted which will trip the mechanism. Moreover, in order to provide still further versatility in the types of selection and classification which may be achieved, a limiter unit is also provided in the thermionic circuit so that in the graph representing the color responses of articles passing through the sorting head a dividing line between accepted and rejected articles on the bi-chromatic chart may be made, consisting not only of a single straight line of any desired slope or position but also a broken line consisting of two or three joined segments having different slopes.

A better understanding of the invention will be afforded by the following detailed description considered in conjunction with the accompanying drawings in which.

Figure 3:
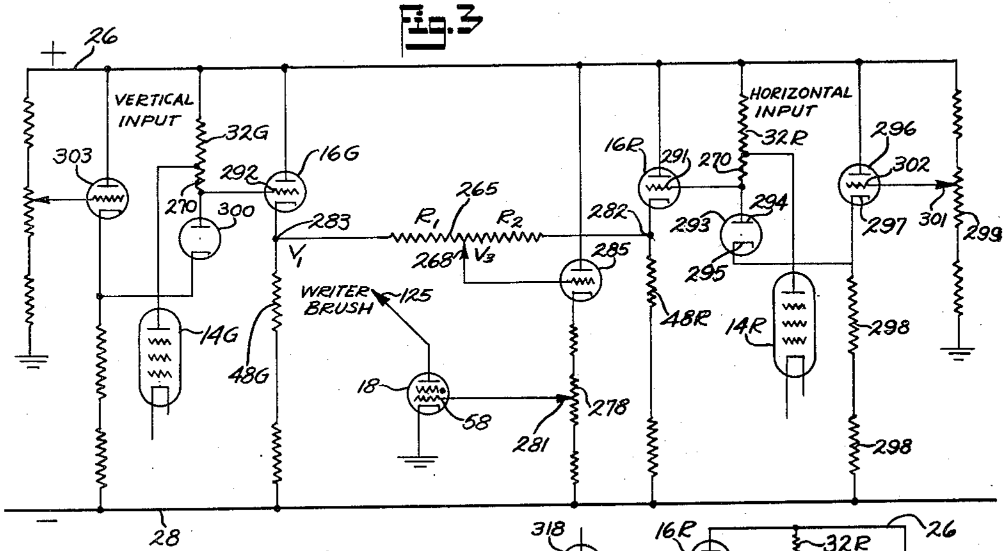
FIG. 3 is a circuit diagram of a modified form of mixer for the apparatus in which provision is made not only for adjustable slope of the output characteristic but also for adding vertical or horizontal segments to the sloping output characteristic curve.
Figure 3A:
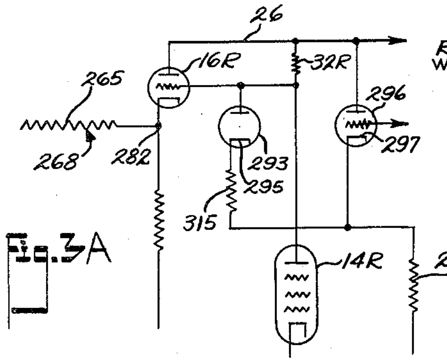
Figure 3B:
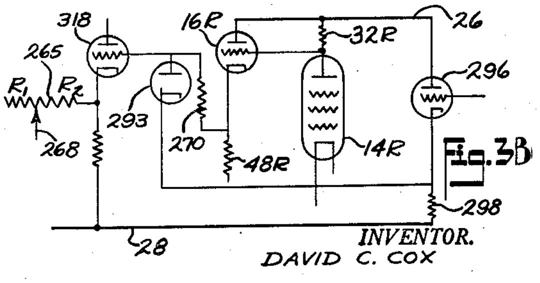
Figure 4:
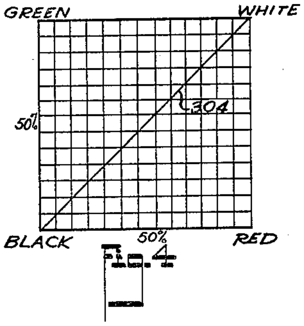
Figure 9:
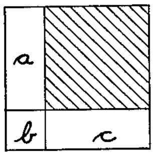
Figure 14:
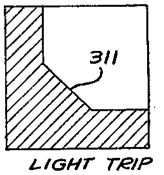
Figure 5:
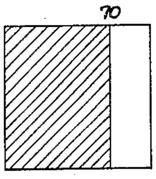
Figure 10:
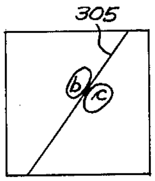
Figure 15:
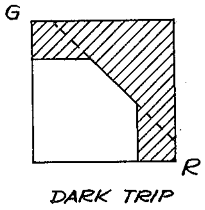
Figure 6:
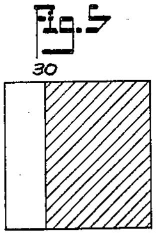
Figure 11:
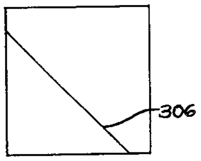
Figure 16:
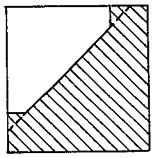
Figure 7:
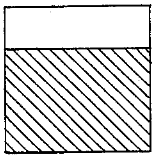
Figure 12:
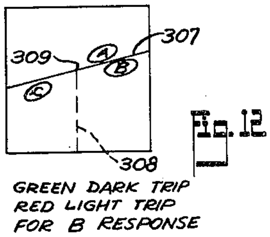
Figure 17:
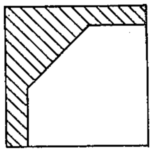
Figure 8:
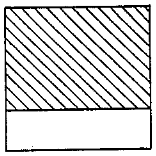
Figure 18:
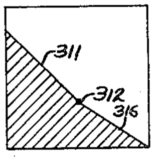
Figure 13:
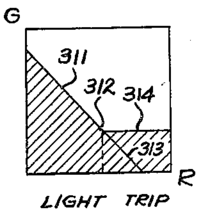
Figure 19:
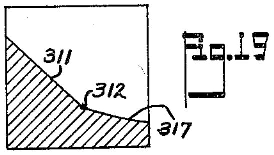
Figure 20:
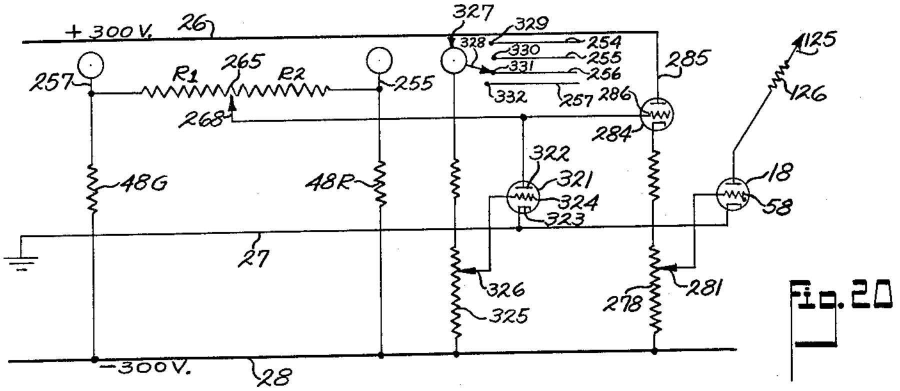
Figure 21:
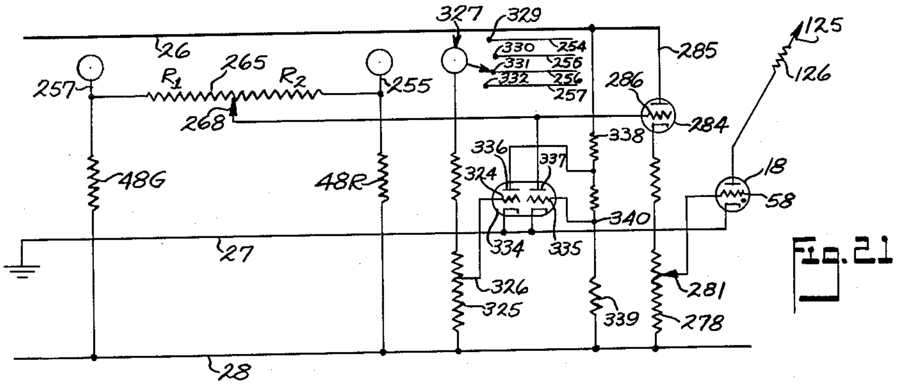
Figure 22:
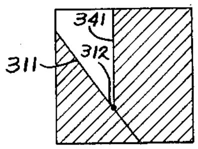
Figure 23:
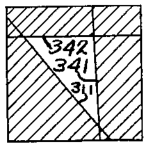
Figure 24:
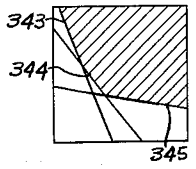
Figure 25:
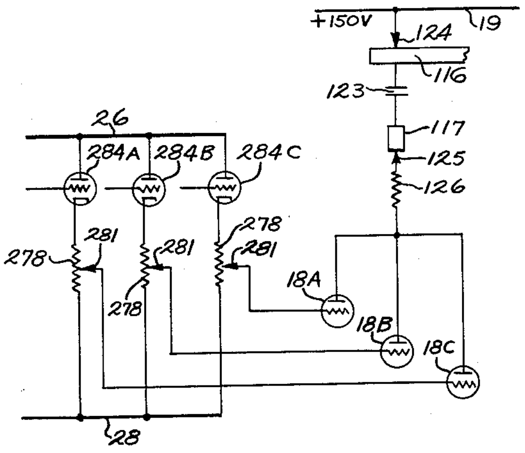

FIG. 3*a* is a fragmentary circuit diagram of a modification of a portion of the circuit of FIG. 3 for sloping the added segments and curving them, if desired;

FIG. 3*b* is a fragmentary circuit diagram of a modification of a portion of the circuit of FIG. 3 for increasing the number of lanes which may be operated without distorting amplifier output;

FIG. 4 is a graph illustrating the color characteristic of the apparatus;

FIG. 5 is a graph illustrating the operation of the apparatus connected for light trip with only one color channel in use, viz., the horizontal color channel, for example, red;

FIG. 6 is a graph corresponding to FIG. 5 except connected for dark trip operation;

FIG. 7 is a graph corresponding to FIG. 5 except utilizing the vertical color channel instead of the horizontal channel, for example utilizing a green channel with light-trip operation;

FIG. 8 is a graph corresponding to FIG. 7 except for dark trip operation;

FIG. 9 is a graph illustrating a simple form of dual-channel operation or bi-chromatic operation connected for dark-trip;

FIG. 10 is a graph illustrating a problem involved in making a separation of articles which cannot be separated by utilizing either a horizontal or a vertical separation line;

FIG. 11 is a graph illustrating the slope of the division line when both color channels are connected for the same trip, either both light-trip or both dark-trip;

FIG. 12 is a graph illustrating the manner of separating two areas on the same side of a sloping separation line by connecting a limiter in one of the color channels;

FIG. 13 is a graph illustrating light-trip operation with a limiter connected in the horizontal or red channel;

FIG. 14 is a graph illustrating light-trip operation with a limiter in both channels;

FIG. 15 is a graph showing dark-trip operation with a limiter in both color channels;

FIG. 16 is a graph illustrating light-trip in the vertical or green channel and dark-trip operation in the horizontal or red channel with a limiter in both channels;

FIG. 17 is a graph of a pattern illustrating operation with light-trip in the red channel and dark-trip in the green channel with limiter action in both channels;

FIG. 18 is a graph illustrating the principle of operation of the form of apparatus in which sloping line segments are added to the original sloping line segment of the pattern boundary by limiter means;

FIG. 19 is a corresponding graph illustrating the type of pattern obtained by utilization of non-linear elements in the limiter to produce curving line segments in the pattern boundary;

FIG. 20 is a fragmentary circuit diagram of an arrangement for modifying the pattern of the graph representing operating characteristics to produce either vertical or horizontal line segments or both;

FIG. 21 is a fragmentary circuit diagram for obtaining increased sharpness at the intersections of the horizontal or vertical lines with the sloping line;

FIGS. 22, 23 are graphs illustrating operation of the apparatus of FIGS. 20 and 21;

FIG. 24 is a graph illustrating the operation of an arrangement for producing a plurality of line segments of different slopes in the separation line representing the operating characteristics of the apparatus, and FIG. 25 is a fragmentary circuit diagram illustrating the manner of combining several mixer circuits to obtain an operation line consisting of a plurality of sloping segments such as represented by the graph of FIG. 24.

Like reference characters are utilized throughout the drawings to designate like parts.

Figure 1:
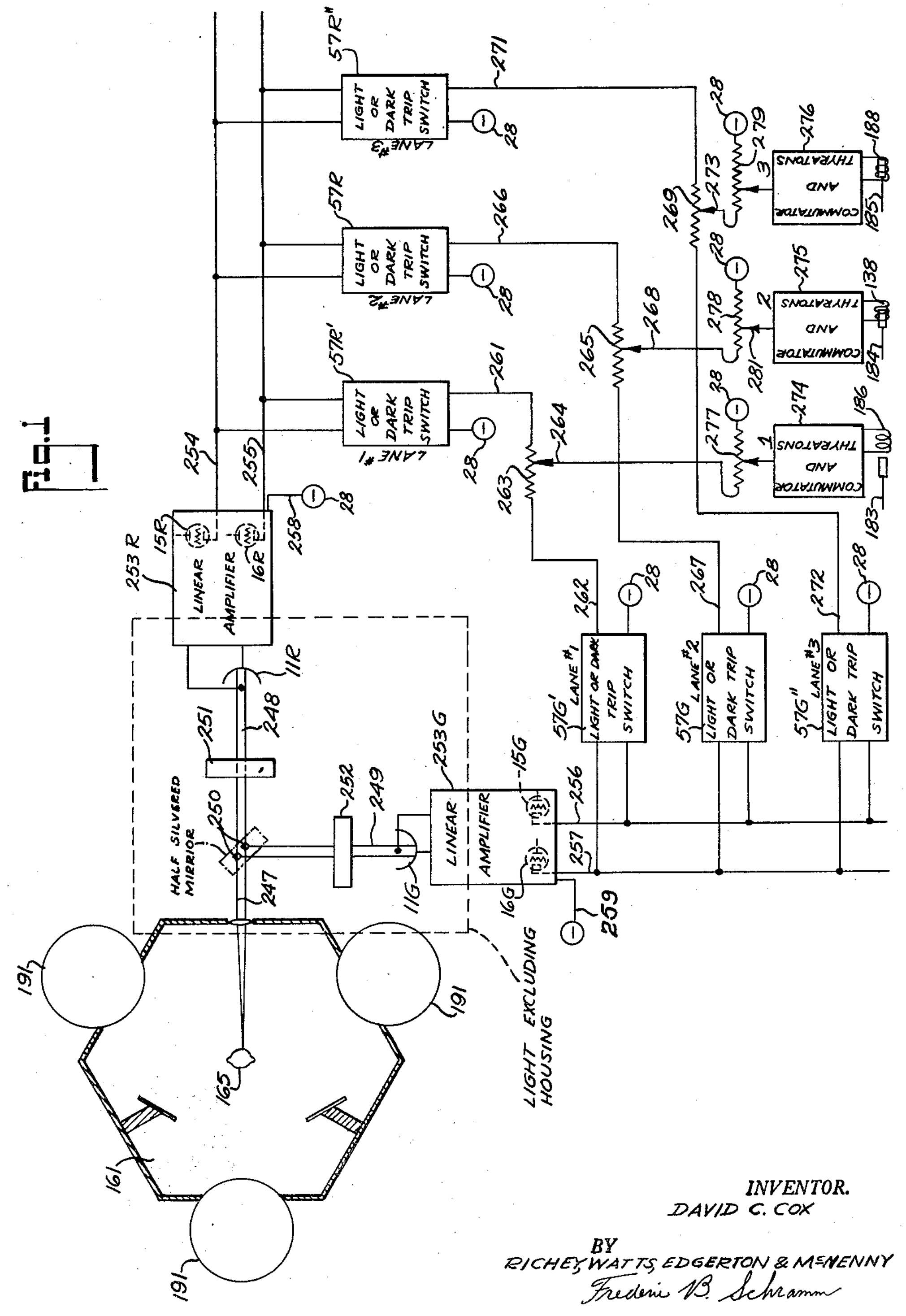
FIG. 1 is a schematic diagram of one embodiment of my invention.

FIG. 1 illustrates schematically the elements of the apparatus employed in addition to that illustrated in my parent application in order to obtain bi-chromatic operation as well as an adjustable slope characteristic, and if desired, introduction of vertical or horizontal segments in the sloping line characteristic. The lamp housing and sorting head 161 of the parent application is illustrated schematically together with the rotatable background members 191 which enable two-point straight line calibration of the photoelectric amplifier to be accomplished. In order that bi-chromatic operation may be obtained two photo-electric cells are employed instead of only the single photoelectric cell 11 of my parent application and these are designated 11R and 11G in FIG. 1.

Means are provided for splitting the light beam 247 reflected from the article being sorted, such as the lemon 165 into two independent light beams 248 and 249. This may take the form of a half-silvered mirror 250 for example, which transmits a portion of the light beam 247 to form a light beam 248 and reflects the remaining portion to form the light beam 249. Interposed in each of the light beams 248 and 249 is a color filter, the filters being of different colors. For example, there may be a red filter 251 and a green filter 252 through which the light beams are transmitted to the photoelectric tubes 11R and 11G, respectively. Associated with each photoelectric tube 11R and 11G is a linear amplifier 253R or 253G, preferably each including a pair of symmetrical stages so that linear output is obtained in response to either light-trip or dark-trip operation, if desired. Each of the linear amplifiers 253R and 253G is of the type illustrated more in detail in FIG. 1 of my parent application Serial No. 294,427 including thermionic tubes 12, 13, 14, 15, 16, 17, 22, 24, 25 and 92.

For simplicity in FIG. 1 of the present application, however, only the cathode follower 15 and the cathode follower 16 represented by reference numerals 15R, 16R, 15G and 16G are indicated in the boxes 253R and 253G schematically indicating the linear amplifiers in the FIG. 1 of the present application. The present invention is not limited, however, to the use of the exact circuit shown in FIG. 1 of parent application as it may be carried out also with other linear circuits or in connection with the simplified form of circuit shown in FIG. 7 of my parent application. Provision is made for either light-trip or dark-trip operation. Two output lines are brought from each amplifier 253R and 253G. In the case of the amplifier 253R there is an output line 255 connected to the cathode of the push or light-trip cathode follower 16R and an output line 254 connected to the cathode of the pull or dark-trip cathode follower 15R. Likewise there are light-trip and dark-trip lines 257 and 256 respectively for the linear amplifier 253G. It will be understood that the amplifiers 253R and 253G are also connected to negative potential through suitable lines 258 and 259 as in FIG. 1 of my parent application and they may also be grounded at suitable points for practical operation of the remainder of the apparatus.

Multi-lane operation or classification into plurality of groups may be accomplished as in my parent application. For this purpose a plurality of light or dark trip reversing switches are provided for each of the amplifiers 253R and 253G. These may correspond to the switch 57 shown in FIG. 1 of the parent application. They are indicated in FIG. 1 of the present application by reference numerals 57R, 57R' and 57R'' for the red amplifier 253R, each having a pair of input lines connected to the amplifier output lines 254 and 255 of the linear amplifier 253R. There are similar light or dark trip reversing switches 57G, 57G' and 57G'', having input connections to the output lines 256 and 257 of the green linear amplifier 253G. Each of the light or dark trip switches may have an output line connected to a negative point in the linear amplifier supply. Each light or dark trip switch has a positive output connection. Thus for lane 1 there is an output connection 261 from the light or dark trip switch 57R' and an output connection 262 from the light or dark trip switch 57G' of the green linear amplifier 253G.

For combining, and if desired, proportioning the red or green outputs from the lines 261 and 262 a mixer potentiometer resistor 263 is provided, which is connected between the lines 261 and 262 and has an adjustable tap 264 adapted to be connected directly or indirectly to the sorter tripping mechanism. Similarly for the second lane there is a mixer potentiometer 265 connected between output lines 266 and 267 of the second lane, red light or dark trip switch 57R and the green light or dark trip switch 57G, and this potentiometer is provided with an adjustable tap 268. In the third lane there is a similar mixer potentiometer 269 connected between lines 271 and 272 with a tap 273.

If desired, the taps 264, 268 and 273 may be connected to the control grids of selector thyratrons 18', 18 and 18'' of my parent application for the respective lanes and magnitude adjustments may be interposed in the lines 261 and 262, 266 and 267, or 271 and 272. Preferably, however, in order that slope may be adjusted independently of magnitude setting for either color, volume-control potentiometers are interposed between the taps 264, 268 and 273 and the corresponding selector thyratron control grids. In FIG. 1 of the present application the commutator and thyratrons of FIG. 1 of the parent application are represented schematically by boxes 274, 275 and 276, each of which includes the thyratron and associated circuit elements. For example, box 275 includes the selector thyratron 18 for the second lane, the classifier thyratron 21, the commutator 19 with its conducting ring 116, its segments 117 to 122, the charge collecting condensers 123, writer brush 125, reader brush 127 and the eraser brush 129, as well as the commutator 139 and other circuit arrangements shown in FIG. 1 of the parent application.

For setting magnitude a potentiometer 277 is interposed between the tap 264 and the commutator-thyratron unit 274, a potentiometer 278 is interposed between the tap 268 and the commutator-thyratron unit 275, and a potentiometer 279 is interposed between the proportioner tap 273 and the commutator-thyratron unit 276. Each of these is connected in the same manner. For example in the case of the second lane the potentiometer 278 consists of a resistor connected between the proportioner tap 268 and a negative point in the supply indicated by the minus sign and there is an output adjusting tap 281 connected to the control grid 58 of the selector thyratron 18 of FIG. 1 of the parent application.

Each of the commutator thyratron units has an output connection to suitable mechanism for controlling the distribution of articles to be sorted such as ejector or trip pan mechanism. As shown, the commutator thyratron unit 274 has an output connection to a trip pan solenoid 186 adapted to retract a trip pin 183. The second lane thyratron unit 275 has a trip pin solenoid 138 adapted to retract the trip pin 184 and the commutator-thyratron unit 276 has a trip pin solenoid 188 adapted to retract the trip pin 185. The trip pins 183, 184, 185 serve the same purpose as illustrated in FIG. 3 of my parent application and the remainder of the classifier apparatus need not be illustrated herein.

Figure 2:
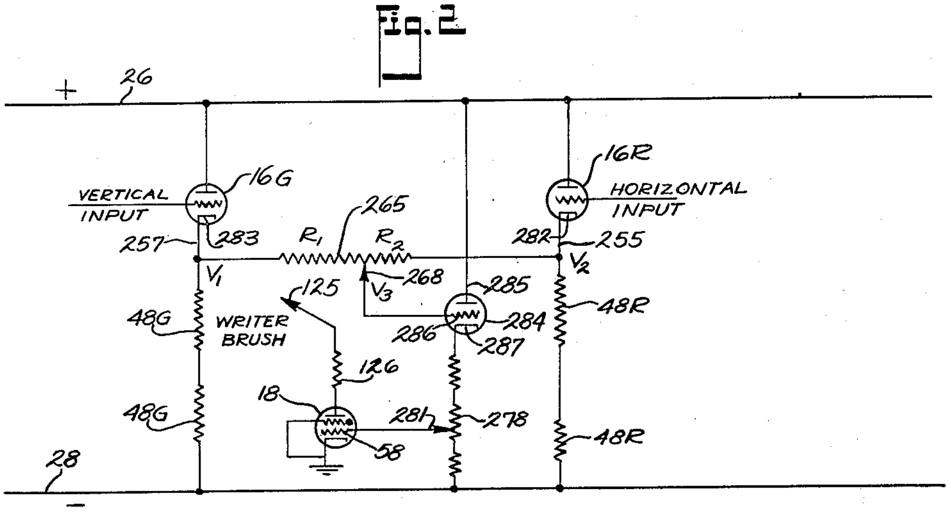
FIG. 2 is a fragmentary circuit diagram of a portion of the apparatus employed for obtaining an adjustable slope output characteristic in a bi-chromatic characteristic chart of the apparatus.

A simple form of proportioning mixer for cases where an adjustable slope bi-chromatic characteristic line is required without horizontal or vertical segments is illustrated in FIG. 2. In connection with the second lane for example, the mixer potentiometer 265 is connected between the cathode 282 (FIG. 2) of the red light-trip cathode follower 16R and the cathode 283 of the green light-trip cathode follower 16G, assuming light-trip operation in both color channels is desired. Although, for simplicity, in FIG. 1, simple potentiometers 277, 278, 279 are connected between the proportioner taps 264, 268 and 273, and the thyratron units 274, 275 and 276, preferably, cathode followers are interposed. For example, a cathode follower stage 284 is interposed between the proportioner tap 268 and the control grid 58 of the selector thyratron 18. It will be understood that if either of the amplifiers were to be operated dark-trip instead of light-trip, the corresponding end of the resistor 265 would be connected to the cathode of the dark trip cathode follower 15R or 15G, as the case may be, instead of as shown in FIG. 2. Reference numerals in FIG. 2 of the present application represent elements having the same reference numerals in the drawings of the parent application with the suffix letters R or G added where suitable to designate the elements of the amplifier for the red or green light beams.

The cathode follower 284 includes a thermionic discharge tube 285, which may take the form of a triode, having an anode connected to the positive side of the voltage supply, a control electrode 286 connected to the proportioner tap 268 and a cathode 287 connected through a potentiometer resistor 278 to the negative side of the voltage supply. The resistor 278 serves both as a cathode resistor for the cathode follower tube 285 and as a potentiometer, having an adjustable tap 281 to provide a magnitude setting in the apparatus. The tap 281 is connected to the control grid 58 of the selector thyratron 18. It will be understood that similar units may be used in connection with the commutator thyratron units 274 and 276.

When it is desired to increase the degree of selectivity of the sorting apparatus by introducing horizontal or vertical line segments in the output characteristic, a limiter is interposed in the output lines from one or both of the linear amplifiers 253R and 253G. This may be accomplished as illustrated in FIG. 3. For example, in the case of the second channel, the proportioner resistor 265 is connected as before to the cathodes 282 and 283 of the cathode followers 16R and 16G for light-trip operation and 15R and 15G for dark-trip operation. For simplicity the light and dark trip switches and the dark-trip connections are omitted in the circuit diagrams of FIGS. 2 and 3. As explained in connection with the parent application, in FIG. 1 thereof, the control grid voltage for the output cathode follower is derived from the anode of a pentode stage (pentode 13 or 14 of parent application Serial No. 294,427). Such stages are represented in FIG. 3 of this application for the two color amplifiers by the tubes 14R and 14G. In order to introduce the limiter feature for the amplifier output in the embodiment of FIG. 3, a limiter is interposed at a suitable point, e.g., in the connection to the control grid 291 of the cathode follower 16R and 292 of the cathode follower 16G. In the case of the cathode follower 16R the limiter takes the form of a diode 293 having an anode 294 connected to the control grid 291 and a cathode 295 connected to a suitable point of potential corresponding to the maximum potential to which the control grid 291 is to be driven, thus preventing the grid 291 from going more positive than the value for which the apparatus is adjusted. Preferably, however, in order to supply a control point which will supply adequate current without requiring a voltage divider drawing excessive current from the power supply, a cathode-follower voltage-setting stage is provided. This comprises a cathode follower tube 296 having an anode connected to the positive side of the power supply, and a cathode 297 to which the cathode 295 of the diode 293 is connected. There is a cathode resistor 298 connected between the cathode 297 and a negative point in the power supply. For adjusting the cathode of the limiter I provide a limit setting potentiometer 299 connected between the positive side of the power supply and a negative point thereon with a limit-setter tap 301 connected to the control grid 302 of the cathode follower tube 296. For the green-light or vertical output there is a similar limiting unit including a diode 300 and a limit setter cathode follower 303 and associated elements for performing these functions as is in connection with the horizontal or red input.

The linear, symmetrical dual output amplifier disclosed in my parent application is adapted for furnishing signals for three different types of classification, (1) without color differentiation or successive single color response, (2) simple color summation, and (3) pattern-blocked color combination. For the simplest classification calling for a plurality of groups based merely on differences in the light reflectivity without regard to differences in reflectivity of different colors, a single amplifier is utilized. For bi-chromatic classification where the differences of articles in their reflection of colored light are utilized, two amplifiers are provided having suitable color filters interposed in the optical system. As described in my pending application, Serial Number 738,714, now Patent No. 2,625,265, the output signals from the two amplifiers may be utilized to deflect a cathode ray beam along different axes so that the location of such a beam on the cathode ray screen represents the color coordinates of the color reflected from such an article. An area of the screen represents the range of color co-ordinates of a group of articles within limits of acceptability or within the limits requiring rejection for a given classification. Theoretically, therefore, even though a cathode ray tube is not utilized in connection with the bi-chromatic sorter of my present application having two amplifiers, the characteristic response resulting from the combination of the output signals of the two amplifiers may be represented by a two dimensional graph. Such a graph is shown in FIG. 4 of the present application. For convenience the red light photoelectric amplifying means may be referred to as the horizontal and the green light photoelectric amplifier means may be referred to as the vertical. In such a graph a black object would be represented at the lower left hand corner, a bright red object with no green components of reflectivity would be represented at the lower right hand corner and a bright green object with no red components of reflectivity would be represented at the upper left hand corner of the graph. Likewise a white article reflecting all colors of light would be represented at the upper right hand corner. Whereas a gray object reflecting all colors of light with equal intensity (or in the present case red and green with equal intensity) would fall somewhere along the gray line 304 drawn between the black and white points. The exact position along the gray line would depend upon the brightness or the darkness of the gray object that is upon the ratio between the light reflected and the light absorbed by the object.

Every article which may be presented for viewing will reflect between 0 and 100% red light and between 0 and 100% green light. Each article is therefore represented somewhere in the field of FIG. 4 by a properly placed dot. Articles reflecting more red than green appear to the right and below the gray line 304; articles reflecting more green than red appear on the other side of the gray line 304.

Countless separations of articles to be sorted may be made by cutting patterns as described in my aforesaid application, Serial Number 738,714, now Patent No. 2,625,265. Many of these patterns may be made electrically by the apparatus of the present application without the use of the cathode tube, the sentinel amplifier, etc. of my aforesaid application Serial No. 738,714, now Patent No. 2,625,265. When such is the case, certain advantages may be had. The network for accomplishing the result electrically may be made much simpler in operation and less costly both to build and to maintain. The pattern, moreover, may be changed without the necessity for cutting a new pattern and merely by the operation of reversing switches such as the light and dark trip switches and the adjustment of potentiometer taps such as the slope adjusting proportioner and the magnitude setter hereinbefore described.

The first type of operation of which the photoelectric amplifier means in my parent application is capable and the operation are represented by graphs of FIGS. 5, 6, 7 and 8. The pattern of FIG. 5 represents light-trip operation under red light. Regardless of what the response of green light may be, the circuit will trip when the reflection of red light exceeds 70%, that is when the object is represented in the graph anywhere outside the shaded portion FIG. 6 is similar but represents dark-trip operation under red light with the circuit adjusted to trip whenever the reflection of red light is less than 30%. FIGS. 7 and 8 represent corresponding light-trip and dark-trip operation by utilizing only green light and disregarding the reflectivity of the sorted article with respect to red light. The dividing lines in any of the graphs of FIGS. 5, 6, 7 and 8 may be moved parallel with themselves merely by adjustment of a potentiometer, for example, the potentiometer 278 for the second channel illustrated in FIG. 1, or the potentiometer 56 in FIG. 1 of my parent application. For such monochromatic operation the tap 268 would be moved to one end or the other of the proportioner resistor 265 or connected directly to the linear amplifier output 266 or 267, the other amplifier not being needed.

A modification of the first type of operation is illustrated by graph of FIG. 9. This represents operation where the first lane is connected to an amplifier for one color and the second lane or gate is connected to an amplifier of the second color, and the operation is made dark-trip in each case. All articles having reflectivities falling to the left of the vertical line into the space including the areas *a* and *b* will be ejected in the first lane, if the first lane is made responsive to the horizontal amplifier. All articles falling below the horizontal line in the space represented by the areas *b* and *c* would be ejected in the first lane if the first lane is made responsive to the vertical amplifier. Thus articles having reflectivities represented by the area *b* would be ejected with either the first or second lane according to which amplifier is used in the first lane and which one in the second lane. If the horizontal amplifier is connected to the first lane, articles within areas *a* and *b* would be dropped into the first lane and articles in the area *c* would be dropped into the second lane. If the horizontal amplifier is used to actuate the second lane, articles within the area *b* and *c* would trip into the first lane and those in the area *a* would trip in the second lane. If desired, chutes from the first and second lanes may be run together so that all articles having reflectivity represented by the areas *a*, *b* and *c* will be combined, and the articles represented by the shaded area of the graph of FIG. 9 would be separate. The same result could be accomplished by employing relays responsive to the two color amplifiers for operating the same ejector mechanism. In this manner a simple form of pattern different from the simple horizontal or vertical straight line device pattern may be obtained, in cases where the patterns of FIGS. 5, 6, 7 or 8 would not be suitable.

For example, articles represented by areas *a*, *b*, and *c* may all be discharged into one lane by the outputs of two thyratrons 18 (of my parent application) from two trip channels to one writer brush 125 of my parent application, somewhat analogous to the connection of thyratrons 18A and 18B of FIG. 25 of the present application.

There is a second type of classification which involves additional difficulty. For example, referring to FIG. 10 in certain cases it is desired to separate articles having reflectivities represented by points within the area *b* from articles having reflectivities represented in the area *c*. This cannot be done by either a horizontal or vertical device line because either a horizontal or vertical line would intersect both areas. The separation can be made, however, if a pattern can be formulated having an oblique or sloping separation line 305. Thus the articles in the area *b* would be tripped out by mechanism connected dark-trip with response to the red or horizontal deflection and connected light trip with response to the green or vertical deflection. In the next lane articles within the area *c* could be tripped out by a light trip setting for the red or horizontal amplifier and dark trip setting for the vertical or green amplifier. The sloping line 305 represented in FIG. 10 is obtained by utilizing a proportioner such as the proportioner potentiometers 263, 265, 269 of FIG. 1 illustrated somewhat in greater detail in the circuit diagram of FIG. 2.

The value of the voltage appearing at the proportioner tap 268 may be computed from the voltage $V_1$ at the cathode-follower cathode 283 and the voltage $V_2$ by the cathode-follower cathode 282 by the following equation:

$$V_3=\frac{R_2}{R_1+R_2}V_1+\frac{R_1}{R_1+R_2}V_2$$

The voltage $V_3$ at which the circuit trips may be held constant by a fixed setting of the cathode tap 268. The equation is then of the form $ax$ plus $by=c$ which is the equation for a straight sloping line. The slope depends upon the relative values of the coefficients $a$ and $b$ and their ratio is determined by the relative values of $R_1$ and $R_2$ determined by the setting of the proportioner tap 268. The significance of the straight line sloping pattern boundary is that for any article lying along a sloping line such as 306 (FIG. 11) the sum of reflectivity to red light and the reflectivity to green light is constant. If both amplifiers are set for light-trip the trip will be actuated whenever this sum is exceeded, which signifies that the point representing the article lies to the right of the line 306. The slope of the line is reversed as in FIG. 10 by changing one of the amplifiers from light-trip to dark-trip.

A third type of classification is represented by graph of FIG. 12 where it is desired not only to separate articles having reflectivities falling within the areas A and B but to avoid combining the articles having reflectivities in the area B and articles which have no reflectivities in area C. In this case a sloping line 307 separates areas A and B but does not separate area B from area C. For example, dark green lemons represented by area C would not be separated from bright yellows represented by the area B, merely by the sloping division line 307. Such separation could be accomplished if the division line were broken and a vertical segment 308 were combined with it. This is accomplished by a limiter unit such as described in connection with FIG. 3. For example in FIG. 12, the mechanism is connected for dark-trip in the green or vertical amplifier and for light trip in the red or horizontal amplifier to trip the "B" articles. The limiter is connected in the vertical amplifier with the limit setting adjusted to produce the vertical line 308 at the point 309 on the line 307 for obtaining a response to articles in the B area without response to "C" articles.

The principle of operation may be understood more readily from the consideration of FIG. 13 which for simplification is represented as having both amplifiers connected for light-trip. The operation will be the same as in connection with FIG. 11 for articles falling on either side of the sloping portion of the pattern boundary line 311. In this case the limiter in the red amplifier is adjusted to prevent voltage signals being produced in the output of the red amplifier exceeding the value represented by the point 312. The result is that the relationship between the sum of the red and green reflectivities represented by the straight line equation no longer holds. For articles which would fall along a lower extension of the sloping line 311 there will be no increase in output of the red amplifier to offset decreases in output from the green amplifier represented by portion 315 of such an extended line. In order to obtain sufficient voltage to operate the trip mechanism regardless of red response of the articles falling in the portion of the graph to the right of the point 312, there must be a green response at least equal to that of the point 312. In consequence the boundary pattern in effect is provided with a straight line horizontal segment 314 so as to provide a pattern having a broken boundary line 311 and 314. If both limiters are employed and light trip operation is utilized in both amplifiers, a pattern with three line segments in the boundary as illustrated in FIG. 14, is produced. For dark operation of both amplifiers the pattern is as in FIG. 15, with the mechanism being actuated for articles within the unshaded portion of the graph. It will be understood that the pattern may be rotated 90° by shifting one of the light and dark trip switches. For example, the pattern illustrated in FIG. 16 produced by connecting the green amplifier light-trip, the red amplifier dark-trip and utilizing both limiters.

The circuit arangement of FIG. 3 provides a pattern with a broken-line pattern boundary consisting of a sloping line segment with a corner cut off by a vertical or horizontal line segment as in FIGS. 12 to 16 inclusive. The invention is not limited thereto, however, but also includes the modification of the pattern by cutting off the corner of the pattern such as FIG. 10 or 11 for example, by line segments which are also sloping but have a different slope from the lines 305 and 306. This may be accomplished for example, as illustrated in FIG. 3A by introducing a resistor 315 in the connection between the cathode 297 of the tube 296 and the cathode 295 of the diode limiter tube 293. In the case of the horizontal or red amplifier, for example, this has the effect of introducing a sloping line segment 316 in the pattern boundary instead of a horizontal line as at 314 as in FIG. 13. This results from the fact that the resistor 315 carries a current which varies in magnitude with fluctuations in the potential of the anode of the tube 14R so that the potential of the control grid 291 of the tube 16R is permitted to rise to some extent but not as much as the potential of the anode of the tube 14R. A diminished voltage variation occurs instead of the potential being held constant as in the arrangement of FIG. 3 illustrated by FIG. 13. The pattern may be cut off at either end of the sloping boundary 311 also by curving line segments instead of horizontal or vertical or sloping straight line segments such as the line segment 316. For example, a curving portion 317 of the pattern boundary may be produced, if desired, by employing a non-linear resistor as the resistor 315 of FIG. 3A. Such a non-linear resistor may be composed for example, of a mixture of silicon carbide and carbon with a suitable binder as described in Patent #1,822,742 to McEachron and #1,992,780 to Skeats.

In order that more than one mixer such as 265 may be utilized in order to control more than one lane without distorting amplifier outputs, current-limiting resistors 270 are provided in the connection between the anode of the tube 14R or 14G and the grid 291 or 292 to which the limiter 293 or 300 is connected. However, to avoid overloading the pentodes 14R and 14G for multilane operation it is preferable to use additional cathode followers as in FIG. 3B. In this case for each mixer, at each end thereof, there is an additional cathode follower such as the cathode follower 318 interposed between the cathode follower 16R (or 16G) and the mixer such as 265 and for each such cathode follower 318 there is a separate limiter tube such as the limiter 293.

A simplified circuit of increased versatility is disclosed in FIG. 20 for producing a straight line segment such as 314 of FIG. 13 or the corresponding vertical line segments instead of horizontal line segments. In the arrangement of FIG. 20 a triode blocking tube 321 is employed instead of the limiter of FIG. 3. The arrangement of FIG. 20 may be utilized for obtaining limiting action on either light or dark trip of either or both the red and green signals. As in the arrangement of FIGS. 1 and 2, a mixer or proportioner 265 is employed with an adjustable tap 268 applying voltage to a cathode follower stage 284 which controls the thyratron 18 included in the commutator thyratron unit 275 of FIG. 1.

The limiting action for producing horizontal or vertical line segments in the characteristic output curve is accomplished by connecting the blocking tube 321 between the control grid 286 of the cathode follower 284 and a point of lower potential such as the ground line 27. The blocking tube 321 has an anode 322 connected to the control grid 286 and a cathode 323 connected to the ground line 27, and a control electrode or grid 324. A voltage divider 325 is provided comprising a resistor having an adjustable tap 326 connected to the control grid 324 of the blocking tube 321. The voltage divider 325 is connected between a point of low potential such as the negative line 28 and one of the four outputs of the linear amplifiers 253R and 253G. Selectivity is accomplished by providing a selector switch 327 having a movable contact 328 and four fixed contacts 329, 330, 331 and 332 connected to the amplifier output lines 254, 255, 256 and 257, respectively.

As shown in FIG. 1 the light and dark trip switches 57R and 57G are employed for connecting the ends of the proportioner resistor 265 to one or the other of the outputs of each of the two amplifiers 253R and 253G. For simplicity, however, in FIG. 20 the connections are shown for light trip for each color utilizing the amplifier output lines 255 and 257. The selector switch 327 is shown in the position for producing dark trip with the green output limited so as to produce the horizontal line such as 314 as illustrated in FIG. 13. The movable contact 328 is connected to the fixed contact 331 which is connected to the output line 256, the dark trip output line of the green amplifier 253G.

When the signal is of such a value to reach or extend beyond the point 312 shown in FIG. 13 (the exact point being determined by the setting of the tap 326 on the voltage divider resistor 325) the potential of the control grid 324 of the blocking tube 321 lies sufficiently above that of the cathode 323 so that the resistance of the blocking tube 321 becomes negligible. The control grid 286 of the cathode follower 284 is in effect shorted to ground. The output signal to the control grid 58 of the thyratron 18 cannot rise with increasing signals on the lines 255 or 257. The thyratron 18 is therefore prevented from tripping by any such signals and the operating result of the apparatus is such as represented by the diagram of FIG. 13 with the shaded portion representing the fact that tripping is prevented from taking place.

If desired, a second blanking circuit and a second selector switch, similarly connected, may be provided with a movable contact coupling the blanking-circuit grid to the red dark trip line 254, so as to produce both a horizontal line segment and a vertical line segment in the graph as in FIG. 14.

FIG. 21 is a modification of FIG. 20 in which an additional stage is provided in the blanking tube circuit in order to accomplish more precise cut off and to avoid rounding the corner of the graph representing the operating characteristics of the apparatus, and to assure complete cut-off of the blanking tube when no blanking is desired. In FIG. 21 a two-stage blanking circuit is provided which may take the form of a double triode 334. Its first stage control grid is connected as in FIG. 20 with its second stage control grid 335 coupled to the first stage anode 336 and the second stage anode 337 connected to the control grid 286 of the cathode follower 284. In the circuit shown the second anode 337 is loaded through anode resistors 338 and 339. One is connected to the positive line 26 and the other to negative line 28 with the coupling accomplished by connecting the second control grid 335 to a point 340 on the resistor 339.

Since the use of an additional stage in the blanking circuit effects a reversal in polarity, in FIG. 21 the input connections to the grid 324 would be reversed. Thus to obtain the pattern illustrated in FIG. 13 from the circuit of FIG. 20 the movable tap 328 of the switch 327 is connected to the fixed contact 331. But to obtain the same pattern from the circuit of FIG. 21, the switch 327 would be connected to the fixed contact 332.

The banking tube circuit for termination of the sloping division line has the advantage, not only of increasd versatility, but of permitting employment of a minimum number of tubes and cathode follower stages, as well as permitting multiplication of lanes which may be controlled without distortion of amplifier output.

FIG. 22 represents an additional characteristic pattern which may be accomplished by the circuits of FIGS. 20 and 21. For example, if in the circuit of FIG. 20 the movable contact 328 were connected to the fixed contact 330 instead of the fixed contact 331 (in FIG. 21, to contact 329 instead of 332) the blanking tube 321 would be responsive to the light trip output line 255 of the red amplifier 253R. The thyratron 18 would be prevented from tripping for any red signal exceeding that represented by the point 312 so as to close all positions of the pattern to the right of the line 341 as in FIG. 22. If a selector switch is arranged to couple a second blanking tube circuit to the light trip output line 257 the thyratron 18 would be prevented from firing for any red signal exceeding the value represented by the line 341 or any green signal representing value above the line 342 so as to close off still more of the pattern as illustrated in FIG. 23.

If it is desired to produce a pattern having two or more line segments of different slopes this may be accomplished also by connecting two or more of the lanes represented in FIG. 1 to the same thyratron. For example, if the proportioner tap 264 of FIG. 1 is adjusted for one slope, the proportioner tap 268 is adjusted for another slope and the proportioner tap 273 is connected for still another slope, separation lines 343, 344 and 345 for different slopes as illustrated in FIG. 24 may be obtained. If all these lanes are connected for dark trip, for example, a voltage of sufficient magnitude to accomplish tripping will be applied to one or the other of the condensers 123 referring to my parent application in one of the commutator-thyratron units 274, 275 and 276 so that for any signal represented by point below or to the left of one of the lines 344, 345 of FIG. 24 tripping will be produced.

By way of illustration there is shown in FIG. 25 an example of a manner of combining the mixers of several lanes or connecting a plurality of mixer units positioned for different slopes so as to obtain the effect as illustrated in FIG. 24. A plurality of mixers such as 265 in FIG. 2 are provided with their ends connected in parallel, or if desired to different output lines of the respective amplifiers. Each is supplied with an independent cathode follower such as the cathode followers 284A, 284B and 284C of FIG. 25 corresponding to the cathode follower 284 of FIG. 2. If desired, circuits, illustrated in FIGS. 20 and 21 may be duplicated with the cathode followers 284 of each represented in FIG. 25 by cathode followers 284A, 284B and 284C. The other portions of the circuit including the thyratron 18 are duplicated so as to provide a plurality of thyratrons 18A, 18B and 18C. The anodes of the three thyratrons are connected together, however, through a common writer brush 125 which is adapted to make contact with one of the drum segments 117, 122 inclusive of the parent application so as to charge one of the condensers 123 whenever one of the thyratrons 18A, 18B and 18C is fired or rendered conductive.

As explained in my parent application, the charge for the condenser 123 is supplied from a positive line such as the 150 v. line 19 having a brush 124 making contact with a slip ring 116 connected to one of the plates of the condenser 123, the other plate being connected to the segment 117. It will be observed in this case that it is immaterial which of the thyratrons is fired, the charge will be placed on the condenser 123 that supplies a signal for causing one of the trip pans described in my parent application to be operated at the proper time. Since the separation lines for the action of the thyratrons 18A, 18B and 18C are represented by lines 343, 344 and 345 respectively of FIG. 24 of the apparatus set for dark trip, an article being sorted will be tripped if its color coordinates fall anywhere below and to the left of the broken separation line represented by the segments 343, 344, 345 of FIG. 24.

While I have described my invention as embodied in concrete form and as operating in a specific manner in accordance with the provisions of the patent statutes, it should be understood that I do not limit my invention thereto, since various modifications thereof will occur to those skilled in the art without departing from the spirit of my invention.

What is claimed is:

1. In sorting apparatus of the type having a photoelectric sorting head with a light beam emitted therefrom having an intensity representing the reflectivity of an article being sorted, means for splitting the emitted beam into first and second beams, a color filter for the first beam, a second color filter for the second beam of a different color from the first color filter, photoelectric amplifier means responsive to the light transmitted through the first color filter, second photoelectric amplifier means responsive to the light transmitted through the second color filter, each amplifier means having an output terminal, voltages appearing at such output terminals corresponding to the magnitude of reflected light beams of different colors, a mixer comprising a resistor connected between said two terminals and a tap connected to said resistor for producing a voltage the value of which is determined by the sum of fractions of the voltages appearing at the said output terminals for actuating an article-ejecting means.

2. Apparatus as in claim 1 including reversing switch means operatively connected between at least one of the photoelectric amplifier means and the mixer for enabling light or dark-trip operation to be obtained selectively in different lanes.

3. In a sorting apparatus of the type having a photoelectric sorting head with a light beam emitted therefrom having an intensity representing the reflectivity of an article being sorted, means for splitting the emitted beam into first and second beams, a color filter for the first beam, a second color filter for the second beam of a different color from the first color filter, first photoelectric amplifier means for producing an electrical output responsive to the light transmitted through the first color filter, second photoelectric amplifier means for producing an electrical output responsive to the light transmitted through the second color filter, proportioning mixer means having first and second input lines connected to said first and second photoelectric amplifier means, respectively, and an output terminal carrying the resultant signal produced by combining the electrical outputs from said photoelectric amplifier means and having a plurality of settings to combine predetermined proportions of the outputs from the photoelectric amplifier means such that for any variation in either or both of the amplifier outputs at any one setting the proportion of each amplifier output as combined is constant to produce at said terminal the resultant output determined by the proportions contributed by each amplifier output, and a selector circuit electrically connected to the output terminal and controlled by the proportioning mixer means, said selector circuit being responsive only to certain resultant signals from said mixer means produced by predetermined desired values of electrical outputs from the first and second photoelectric amplifier means proportionally combined as determined by the mixer means.

4. Apparatus as in claim 3 having a limiter means adapted to be connected to the output circuit of at least one of the photoelectric amplifier means for enabling a characteristic curve to be obtained in the form of a broken line including a horizontal or vertical segment in addition to a sloping segment.

5. Apparatus as in claim 3 wherein a resistor is connected to the limiter means, whereby the added segment is tipped to produce a broken line including at least two sloping segments.

6. Apparatus as in claim 3, wherein the resistor connected to the limiter means is non-linear, whereby the added segment is curved.

7. Apparatus as in claim 3 including reversing switch means interposed between at least one of the amplifier means and the mixer means for enabling light or dark-trip operation to be obtained.

8. Apparatus as in claim 3, wherein the mixer means is provided with said output terminal and a blanking tube having one electrode connected to said output terminal and a cathode connected to a line of lower potential than said output terminal, said blanking tube having a control electrode coupled to the voltage output of one of said amplifiers for controlling the grid cathode bias of the tube for rendering the blanking tube conductive and creating a short between said mixer output terminal and said line whenever such amplifier output reaches a predetermined value.

9. In a bi-chromatic photoelectric sorting apparatus, a mixing circuit for obtaining a sloping outward characteristic therefrom, comprising a first output terminal and a second output terminal at which voltages appear each corresponding to the magnitude of a reflected light beam of a different color, a resistor connected between said two terminals, a tap connected to said resistor at which appears a resultant voltage proportional to the sum of the fractions of the voltages appearing at said output terminals, the position of said tap on said resistor determining the value of the resultant voltage, a selector circuit electrically connected to said tap and responsive to only predetermined desired resultant voltage values, and means for producing a horizontal and vertical segment in the sloping line characteristic of the apparatus comprising a uni-lateral conducting device effectively connected between one of the first or second output terminals and a point of fixed potential for limiting the output thereof to said fixed potential value.

10. Apparatus as in claim 9 including a limit setter comprising a potentiometer connected between the point of higher potential and a point of lower potential, a thermionic conducting device having an anode, a control grid connected to a point on said potentiometer and a cathode with a cathode resistor connected to said point of lower potential, said cathode serving as the point of fixed potential to which the uni-lateral conducting device is connected whereby requisite current for producing limiter action may be provided without voltage variation at the tap of said limit setter potentiometer.

11. The combination of a pair of thermionic amplifiers each having an input terminal to which varying input signals may be applied, and one having a first and the other a second output terminal; proportioning mixer means having first and second input lines connected to said first and second output terminals of said thermionic amplifiers respectively, and an output terminal carrying the resultant signal produced by combining the electrical outputs from said photoelectric amplifier means and having a plurality of settings to combine predetermined proportions of the outputs from the thermionic amplifiers such that for any variation in either or both of the amplifier outputs at any one setting the proportion of each amplifier output as combined is constant to produce at said terminal the resultant output determined by the proportions contributed by each amplifier output; a voltage responsive classifier mechanism electrically connected to the output terminal of said proportioning mixer means and responsive to only predetermined desired resultant voltage values produced by said mixer means.

12. Apparatus as in claim 11 wherein the mixer means is made adjustable so as to provide the relative proportions of the amplifier outputs affecting the mixer output for the purpose of varying the slope of the separation line caused by the resultant output.

13. Apparatus as in claim 12 wherein limiting means are included in one of the amplifiers for limiting the output thereof so as to add a segment in said separation line differing in slope from the remainder of the separation line.

14. Apparatus as in claim 13 wherein a resistor is connected in the limiter means for causing the added line segment of the separation line to be sloping.

15. Apparatus as in claim 14 wherein the resistor of the limiter means is non-linear whereby the added line segment is made curving.

16. In a sorting apparatus, the combination comprising means for producing a first signal dependent upon reflectivity of light of one color from the object, means for producing a second signal dependent upon reflection of light of a second color, proportioning mixer means having first and second input lines for receiving said first and second signals respectively, and an output terminal carrying the resultant signal produced by combining the first and second signals and having a plurality of settings to combine predetermined proportions of the first and second signals such that for any variation in either or both of the first and second signals at any one setting the proportion of each of said first and second signals as combined is constant to produce at said terminal the resultant output determined by the proportions contributed by each of said first and second signals and a selector circuit electrically connected to said output terminal of and controlled by the proportioning mixer means, said selector circuit being responsive only to signals from said mixer means produced by predetermined values of the two signals proportionally combined as determined by the setting of the said mixer means.

17. In combination a pair of amplifier output terminals, mixer means having input terminals connected between the amplifier output terminals and having a mixer output terminal, a blanking stage having a current conductive electrode connected to the mixer output terminal and a cathode connected to a line of lower potential than said output terminal for shorting the mixer output and said line when the blanking stage is rendered conductive, said blanking stage having a control electrode connected to one of the said amplifier terminals and responsive to a predetermined potential thereof for rendering the blanking stage conductive when the output at such amplifier terminal reaches a predetermined value.

18. The combination of a pair of thermionic amplifiers having input terminals to which varying input signals may be applied and having output terminals, mixer means connected between the output terminals, and voltage-responsive classifier mechanism actuated by the mixer means, said mixer means having three terminals, two being input terminals connected between said amplifier output terminals, and the third being a mixer output terminal leading from said mixer means and connected to the classifier mechanism, a unilateral conducting device operatively connected between said mixer output terminal and a line at a lower potential than said mixer output terminal said unilateral conducting device having means for rendering it conductive and causing a short between said mixer terminal and lower potential line when an amplifier output attains a predetermined level.

19. In combination a pair of amplifiers, each having an output terminal, a mixer with end terminals and an output terminal, the end terminals each being connected to separate ones of the amplifier terminals, a blanking unit having a control electrode for rendering it conductive and having a current conductive electrode and a cathode, the blanking unit current conducting electrode being operatively connected to the mixer output terminal and said cathode being connected to a line at a lower potential than said mixer output terminal, and a coupling between said control electrode and one of said amplifier terminals for controlling the bias of said control electrode whereby when the level at such amplifier terminal attains a predetermined value the blanking tube is rendered conductive and a short is created between said mixer output terminal and said lower potential line.

20. Apparatus as in claim 19 in which a cathode follower is provided for the mixer output terminal, said follower having a control grid connected to the said mixer output terminal, and a thyratron is coupled to said cathode follower.

21. Apparatus as in claim 19 wherein each amplifier includes a cathode follower stage coupled to the amplifier with a cathode terminal serving as the amplifier output terminal, whereby mixer-output-circuit paralyzing current flowing in the blanking stage will be substantially without effect on any similar other mixer means connected to the circuit.

22. In combination a pair of amplifiers each with an output terminal, mixer means connected between the output terminals of both amplifiers for combining the output thereof and having a mixer output terminal leading therefrom, a blanking stage having a pair of electrodes one being operatively connected to the mixer output terminal and the other to a line of lower potential than said mixer output terminal for causing a short across said mixer output terminal and said line when the blanking stage is rendered conductive, said blanking stage having a control electrode and a connection between said control electrode and one of said amplifier output terminals for rendering the blanking stage effective when the output at such amplifier terminal reaches a predetermined value.

23. In a sorting apparatus of the type having a photoelectric sorting head, with light emitted therefrom, having an intensity representing the reflectivity of an article being sorted, first and second color filters of different colors arranged to receive different portions of such light, first photoelectric amplifier means for producing an electrical output responsive to the light transmitted through the first color filter, second photoelectric amplifier means for producing an electrical output responsive to the light transmitted through the second color filter, proportioning mixer means having first and second input lines connected to said first and second photoelectric amplifier means, respectively, and an output terminal carrying the resultant signal produced by combining the electrical outputs from said photoelectric amplifier means, and having a plurality of settings to combine predetermined proportions of the outputs from the photoelectric amplifier means such that for any variation in either or both of the amplifier outputs at any one setting the proportion of each amplifier output as combined is constant to produce at said terminal the resultant output determined by the proportions contributed by each amplifier output; and a selector circuit electrically connected to and controlled by the proportioning mixer means, said selector circuit being responsive to signals on said mixer output terminal produced by predetermined values of the electrical output from the amplifier means proportionally combined as determined by the setting of said mixer means.

References Cited in the file of this patent

UNITED STATES PATENTS

| | | |
|---|---|---|
| 2,014,174 | Francis | Sept. 10, 1935 |
| 2,142,378 | Sachtleben | Jan. 3, 1939 |
| 2,244,826 | Cox | June 10, 1941 |
| 2,264,621 | Cox | Dec. 2, 1941 |
| 2,386,892 | Hadfield | Oct. 16, 1945 |
| 2,397,337 | Clough | Mar. 26, 1946 |
| 2,443,864 | MacAuley | June 22, 1948 |
| 2,457,131 | Curtiss | Dec. 28, 1948 |
| 2,495,780 | Shepard | Jan. 31, 1950 |
| 2,547,621 | Chapman | Apr. 3, 1951 |
| 2,623,635 | Ward | Dec. 30, 1952 |
| 2,625,265 | Cox | Jan. 13, 1953 |
| 2,656,923 | Cox | Oct. 27, 1953 |
| 2,679,554 | Hurford | May 25, 1954 |
| 2,690,258 | Cox | Sept. 28, 1954 |
| 2,775,654 | Weighton et al. | Dec. 25, 1956 |

OTHER REFERENCES

"Waveforms," text by Chance et al.; pages 645–646, pub. 1949 by McGraw-Hill Book Co., Inc., N.Y.C.

UNITED STATES PATENT OFFICE

CERTIFICATE OF CORRECTION

Patent No. 3,012,666 December 12, 1961

David C. Cox

It is hereby certified that error appears in the above numbered patent requiring correction and that the said Letters Patent should read as corrected below.

Column 2, line 2, for "examlpe" read -- example --; column 7, line 75, after "portion" insert a period; column 9, line 30, strike out "no"; column 10, line 13, for "as FIG." read -- as in FIGS. --; line 40, for "Patent" read -- Patents --; column 11, line 72, for "banking" read -- blanking --; column 13, line 68, for the claim reference numeral "3" read -- 4 --; line 72, for the claim reference numeral "3" read -- 5 --; column 14, line 53, for "photoelectric amplifier means" read -- thermionic ampliiiers --.

Signed and sealed this 11th day of September 1962.

(SEAL)
Attest:

ERNEST W. SWIDER
Attesting Officer

DAVID L. LADD
Commissioner of Patents